United States Patent
Misu

(10) Patent No.: US 8,994,999 B2
(45) Date of Patent: Mar. 31, 2015

(54) IMAGE FORMING APPARATUS THAT USES APPROPRIATE PRINT CONTROL DEVICE TO COMPLETE PRINTING AT HIGH SPEED

(71) Applicant: Kyocera Document Solutions Inc., Osaka (JP)

(72) Inventor: Kazuto Misu, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/082,399

(22) Filed: Nov. 18, 2013

(65) Prior Publication Data

US 2014/0139875 A1  May 22, 2014

(30) Foreign Application Priority Data

Nov. 22, 2012 (JP) .................... 2012-256945

(51) Int. Cl.
 *G06F 3/12* (2006.01)
 *G06K 15/02* (2006.01)

(52) U.S. Cl.
 CPC ............ *G06F 3/1211* (2013.01); *G06F 3/1244* (2013.01); *G06F 3/126* (2013.01); *G06F 3/1282* (2013.01); *G06K 15/1822* (2013.01); *G06K 15/1856* (2013.01)
 USPC .......... 358/1.15; 358/1.13; 718/103; 718/105

(58) Field of Classification Search
 CPC ..... G06F 3/126; G06F 3/1211; G06F 3/1261; G06F 3/1262; G06F 3/1275; G06F 3/1279; G06F 3/1296; G06F 9/5044; H04N 2201/0094; H04N 1/00954
 USPC .................. 358/1.13, 1.15; 718/103, 105
 See application file for complete search history.

(56) References Cited

U.S. PATENT DOCUMENTS

| | | | | |
|---|---|---|---|---|
| 5,619,624 | A * | 4/1997 | Schoenzeit et al. | 345/418 |
| 6,215,559 | B1 * | 4/2001 | Bryniarski et al. | 358/1.15 |
| 6,373,585 | B1 * | 4/2002 | Mastie et al. | 358/1.15 |
| 8,134,724 | B2 * | 3/2012 | Kephart et al. | 358/1.15 |
| 8,773,689 | B2 * | 7/2014 | Kohli et al. | 358/1.15 |
| 2005/0102442 | A1 * | 5/2005 | Ferlitsch | 710/15 |
| 2006/0114497 | A1 * | 6/2006 | Anderson et al. | 358/1.15 |

FOREIGN PATENT DOCUMENTS

JP           11024855         1/1999

* cited by examiner

*Primary Examiner* — Jacky X Zheng

(74) *Attorney, Agent, or Firm* — K&L Gates LLP

(57) ABSTRACT

An image forming apparatus has a print engine, a job issuing device, two print control devices that control the print engine, and a job assignment device that assigns the print job to one of the two print control devices that is appropriate for the print job. Each print control device notifies the print engine of print information corresponding to the print job and manages already-indicated latest information, which is the latest print information. The print information is different from the already-indicated latest information. When making a switchover between the two print control devices to select a switched-to print control device, which is a print control device to which to assign the print job, the job assignment device causes the switched-to print control device to delete the already-indicated latest information managed by the switched-to print control device.

5 Claims, 17 Drawing Sheets

33a PRINT INFORMATION

| PAPER SIZE SETTING | B5 |
|---|---|
| PRINT TYPE SETTING | COPY |
| COLOR SETTING | MONOCHROME |
| . . . | . . . |

38b JOB INFORMATION

| JOB ID | JOB TYPE INFORMATION |
|---|---|
| JOB001 | PRINT JOB TARGETED AT MFP PRINT SYSTEM |
| JOB002 | PRINT JOB TARGETED AT OPTIONAL PRINT SYSTEM |
| × × × | × × × |

Fig. 5

38c ALREADY-INDICATED LATEST INFORMATION

| PAPER SIZE SETTING | A4 |
|---|---|
| PRINT TYPE SETTING | FAX |
| COLOR SETTING | COLOR |
| ⋮ | ⋮ |

Fig. 6

| JOB SEQUENCE | JOB ID | JOB TYPE | JOB STATE |
| --- | --- | --- | --- |
| 3 | JOB102 | PRINT JOB TARGETED AT MFP PRINT SYSTEM | WAITING |
| 2 | JOB101 | PRINT JOB TARGETED AT OPTIONAL PRINT SYSTEM | WAITING |
| 1 | JOB100 | PRINT JOB TARGETED AT MFP PRINT SYSTEM | ALREADY ASSIGNED |

Fig. 12A

| JOB SEQUENCE | JOB ID | JOB TYPE | JOB STATE |
| --- | --- | --- | --- |
| 3 | JOB202 | PRINT JOB TARGETED AT MFP PRINT SYSTEM | WAITING |
| 2 | JOB201 | PRINT JOB TARGETED AT OPTIONAL PRINT SYSTEM | ALREADY ASSIGNED |
| 1 | JOB200 | PRINT JOB TARGETED AT OPTIONAL PRINT SYSTEM | ALREADY ASSIGNED |

Fig. 12B

| JOB SEQUENCE | JOB ID | JOB TYPE | JOB STATE |
| --- | --- | --- | --- |
| 3 | JOB302 | PRINT JOB TARGETED AT MFP PRINT SYSTEM | ALREADY ASSIGNED |
| 2 | JOB301 | PRINT JOB TARGETED AT MFP PRINT SYSTEM | ALREADY ASSIGNED |
| 1 | JOB300 | PRINT JOB TARGETED AT MFP PRINT SYSTEM | ALREADY ASSIGNED |

Fig. 12C

| PAPER SIZE SETTING | B5 |
|---|---|
| COLOR SETTING | MONOCHROME |

Fig. 15

IMAGE FORMING APPARATUS THAT USES APPROPRIATE PRINT CONTROL DEVICE TO COMPLETE PRINTING AT HIGH SPEED

INCORPORATION BY REFERENCE

This application is based upon, and claims the benefit of priority from, corresponding Japanese Patent Application No. 2012-256945, filed in the Japan Patent Office on Nov. 22, 2012, the entire contents of which are incorporated herein by reference.

FIELD

Unless otherwise indicated herein, the description in this background section is not prior art to the claims in this application and is not admitted to be prior art by inclusion in this section. The present disclosure relates to an image forming apparatus that prints at high speed.

BACKGROUND

A typical image forming apparatus includes a printer engine that performs printing on print paper, two controllers that control the printer engine according to a print job, and a reception data assignment unit that assigns the print job to any one of the two controllers, whichever is appropriate for the print job. The reception data assignment unit determines which of text data and graphic data is the main reception data. If the reception data assignment unit determines that the text data is the main reception data, the text data is assigned to the controller targeted at the text data. If the reception data assignment unit determines that the graphic data is the main reception data, the graphic data is assigned to the controller targeted at graphic data.

However, regarding the above typical image forming apparatus, if the controller notifies the printer engine of print information, which is information used by the printer engine, according to the print job, completion of printing is delayed by a time equal to the processing time taken by the controller to notify the printer engine of the print information.

SUMMARY

The present disclosure relates to an image forming apparatus that uses one of two print control devices, whichever is appropriate for a print job issued by a job issuing device, to complete printing at high speed.

An image forming apparatus according to an embodiment of the present disclosure includes: a print engine that performs printing on a recording medium; a job issuing device that issues a print job used by the print engine; two print control devices that control the print engine corresponding to the print job issued by the job issuing device; and a job assignment device that assigns the print job issued by the job issuing device to one of the two print control devices that is appropriate for the print job.

Each of the two print control devices: (i) notifies the print engine of print information, which is used by the print engine in printing, corresponding to the print job; and (ii) manages already-indicated latest information, which is latest print information of which the print engine has been notified.

The print information is different from the already-indicated latest information.

When the job assignment device makes a switchover between the two print control devices to select a switched-to print control device, which is a print control device to which to assign the print job, the job assignment device causes the switched-to print control device to delete the already-indicated latest information managed by the switched-to print control device.

Additional features and advantages are described herein, and will be apparent from the following Detailed Description and the figures.

BRIEF DESCRIPTION OF THE FIGURES

In the accompanying drawings:

FIG. 5 is a tabular diagram illustrating an example of job information included in the MFP body;

FIG. 6 is a tabular diagram illustrating an example of already-indicated latest information included in the MFP body;

FIG. 12A is a tabular diagram illustrating an example of a queue managed by the arbitrator;

FIG. 12B is a tabular diagram illustrating an example of another queue managed by the arbitrator;

FIG. 12C is a tabular diagram illustrating an example of yet another queue managed by the arbitrator;

FIG. 15 is a tabular diagram illustrating an example of differential data created by the MFP print system;

DETAILED DESCRIPTION

Figure 1:
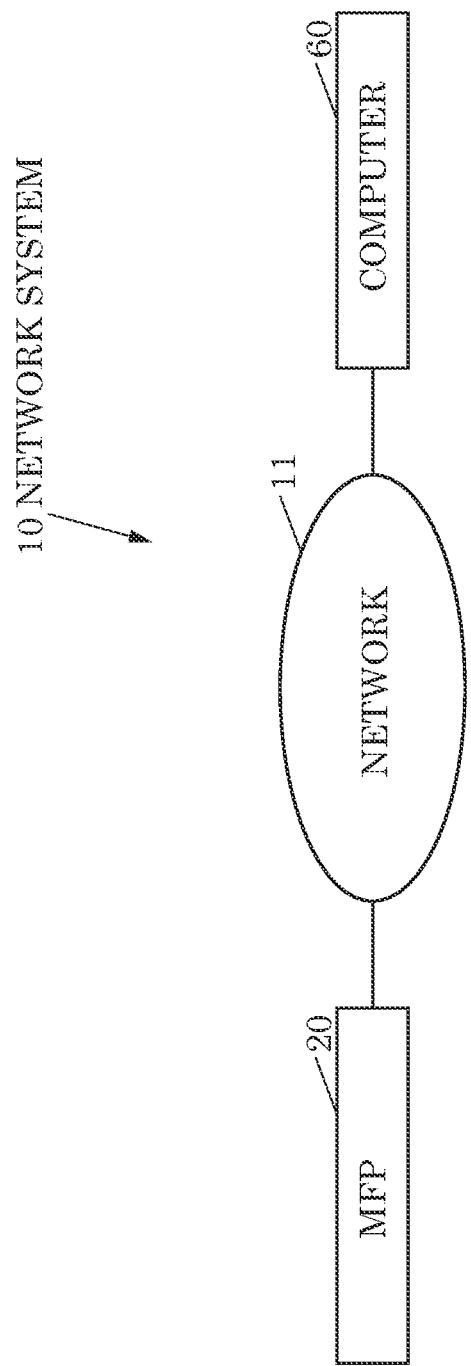
FIG. 1 is a block diagram illustrating the configuration of a network system in an embodiment of the present disclosure.

FIG. 1 is a block diagram illustrating the structure of a network system 10 in an embodiment of the present disclosure.

The network system 10 includes an MFP 20, which is used as an image forming apparatus, and also has a computer 60, such as a personal computer (PC), that can transmit print data to the MFP 20. The MFP 20 and computer 60 are connected so as to mutually communicate through a network 11 such as a local area network (LAN) or the Internet.

Figure 2:
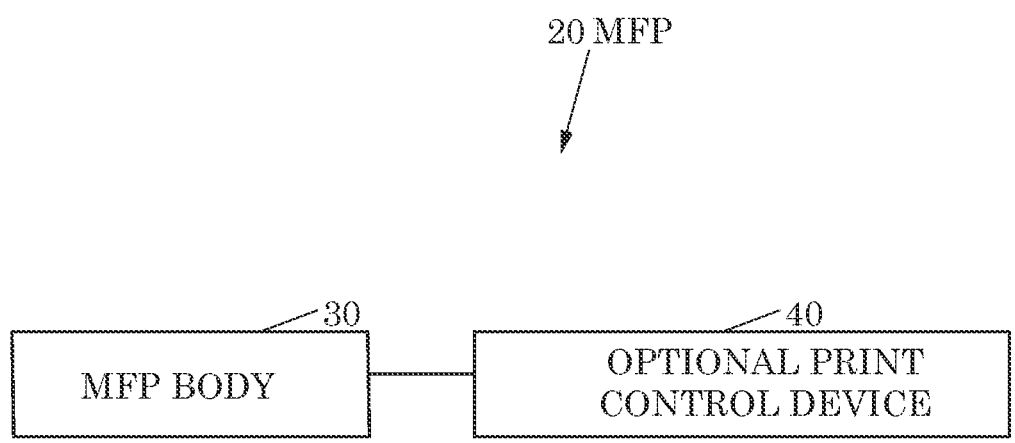
FIG. 2 is a block diagram illustrating the configuration of a multi-function peripheral (MFP) in the network system.

FIG. 2 is a block diagram illustrating the structure of an MFP 20.

The MFP 20 includes an MFP body 30, which performs printing on paper or other recoding medium, and also has an optional print control device 40 connected to the MFP body 30 as an option to improve printing functions of the MFP body 30. Even if the optional print control device 40 is not connected to the MFP body 30, it can also be used alone to perform printing on a recoding medium.

Figure 3:
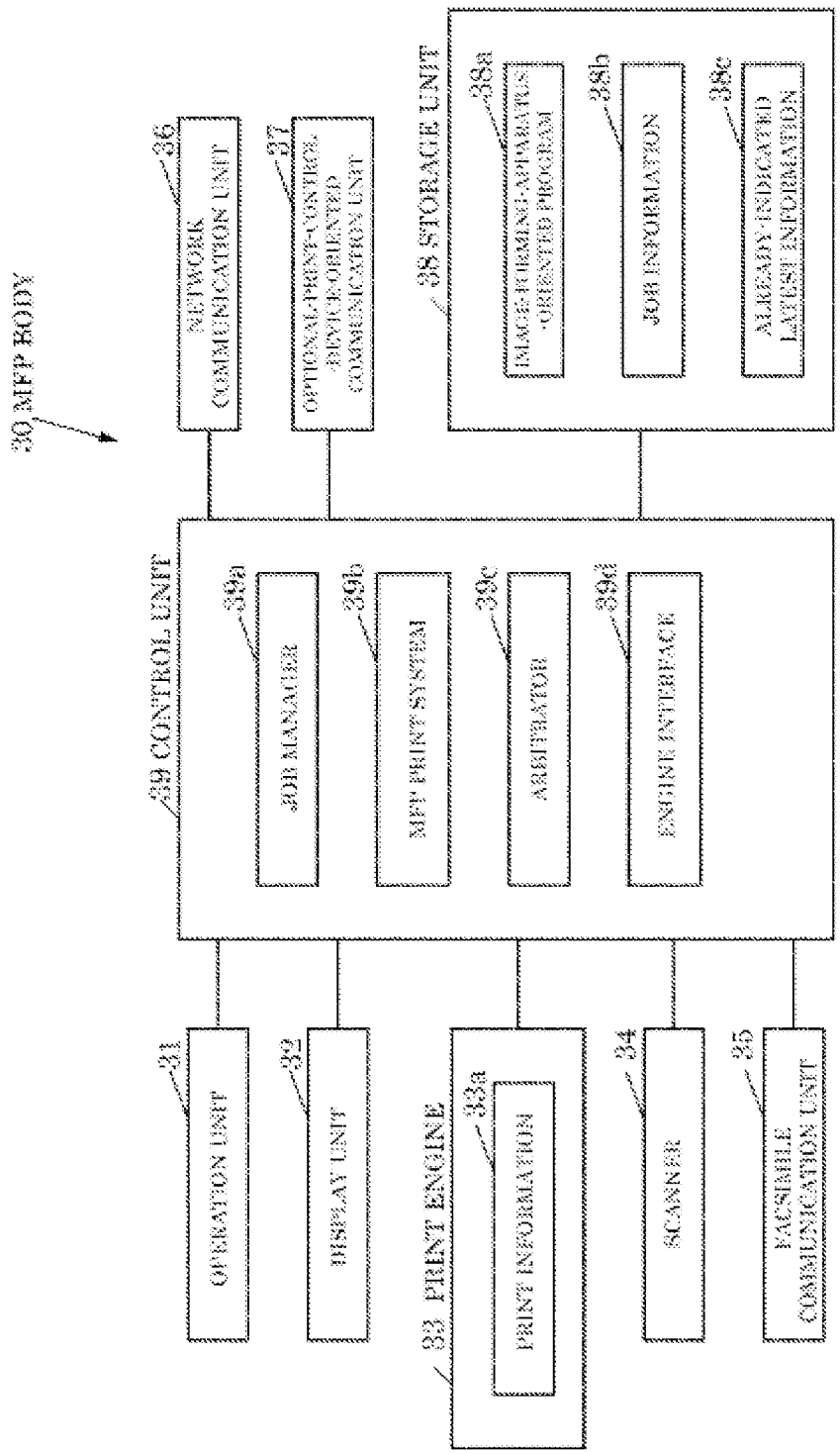
FIG. 3 is a block diagram illustrating the configuration of an MFP body of the MFP.

FIG. 3 is a block diagram illustrating the structure of the MFP body 30.

The MFP body 30 includes: an operation unit 31, which is an input device having buttons and other controls used by a user to have various operations accepted; a display unit 32, such as a liquid crystal display (LCD) that displays various types of information; a print engine 33, which performs printing on a recording medium; a scanner 34, that reads an image from a draft; a facsimile communication unit 35, that carries out facsimile communication with an external facsimile machine (not illustrated) through a communication line such as a public telephone line; a network communication unit 36, hat communicates with an external apparatus through the network 11; an optional-print-control-device-oriented communication unit 37, that communicates with the optional print control device 40 (see FIG. 2); a storage unit 38, such as an electrically erasable programmable read-only memory (EEPROM) or a hard disk drive (HDD) in which various types of information can be stored; and a control unit 39 that controls a whole of the MFP body 30.

The operation unit 31 may include an input device that forms a touch panel together with the display unit 32.

In the print engine 33, print information 33a, which is information used in printing, is stored in an EEPROM or another storage device.

Figure 4:
FIG. 4 is a tabular diagram illustrating an example of print information included in the MFP body.

FIG. 4 illustrates an example of the print information 33a.

The print information 33a includes for example, a paper size setting, which indicates the size of paper fed by the print engine 33, a print type setting, which indicates a type of printing, such as faxing, copying, or report printing, and a color setting, which indicates which toner, color toner or monochrome toner, will be used by the print engine 33. The report printing refers to, for example, printing of a service status page, which is a detailed report about various settings in the MFP 20, or an error report, which is a detailed report about errors generated in the MFP 20.

When the print engine 33 is managing billing charged for printing, the print type setting is information used by the print engine 33 to, for example, determine whether printing to be performed is a type of printing subject to billing or to determine a type of billing charged on the printing. If a key card, a key counter, or another device required for billing is not attached to the MFP 20, the print engine 33 does not perform a type of printing subject to billing (such as faxing or copying), but even in this case, the print engine 33 performs a type of printing not subject to billing (such as report printing). For types of printing subject to billing, such as 100 sheet of printing in faxing and 200 sheets of printing in copying, the print engine 33 also manages billing for each type of printing.

As illustrated in FIG. 3, the storage unit 38 stores an image-forming-apparatus-oriented program 38a, which is executed by the MFP body 30, job information 38b, which is information related to print jobs used for printing by the print engine 33, and already-indicated latest information 38c, which is the latest print formation of which an MFP print system 39b (described later) has notified the print engine 33, the already-indicated latest information 38c being used by the print engine 33 in printing by the print engine 33.

The image-forming-apparatus-oriented program 38a may be installed in the MFP body 30 during the manufacturing of the MFP body 30, may be installed in the MFP body 30 from a secure digital (SD) memory card, a universal serial bus (USB) memory, or another type of storage medium, or may be installed in the MFP body 30 through the network 11.

FIG. 5 illustrates an example of the job information 38b.

In the job information 38b, a job ID and job type information are associated; the job ID is job identification information that identifies a print job, and the job type information indicates a print system, the MFP print system 39b (see FIG. 3) (described later) or an optional print system 43a (see FIG. 7) (described later), targeted at the print job.

In the job information 38b in, for example, FIG. 5, job type information about a print job having a job ID of Job001 is "print job targeted at the MFP print system" and job type information about a print job having a job ID of Job002 is "print job targeted at the optional print system".

FIG. 6 illustrates an example of the already-indicated latest information 38c.

The already-indicated latest information 38c stores information having the same items as the print information 33a in FIG. 4.

The control unit 39 in FIG. 3 includes, for example, a central processing unit (CPU), a read-only memory (ROM) in which programs and various types of data are prestored, and a random-access memory (RAM) used by the CPU as a work area. The CPU executes programs stored in the ROM or storage unit 38.

When the control unit 39 executes the image-forming-apparatus-oriented program 38a stored in the storage unit 38, the control unit 39 functions as a job manager 39a used as a job issuing device that issues a print job, the MFP print system 39b used as a print control device that controls the print engine 33 according to the print job issued by the job manager 39a, an arbitrator 39c, used as a job assignment device, that assigns a print job issued by the job manager 39a to the MFP print system 39b or the optional print system 43a described later, whichever is the print control device appropriate for the print job, and an engine interface 39d, which controls communication with the print engine 33.

The MFP print system 39b executes drawing process depending on the print job. The MFP print system 39b can also command the print engine 33 to perform punching, stapling, or other post-process according to the print job.

Figure 7:
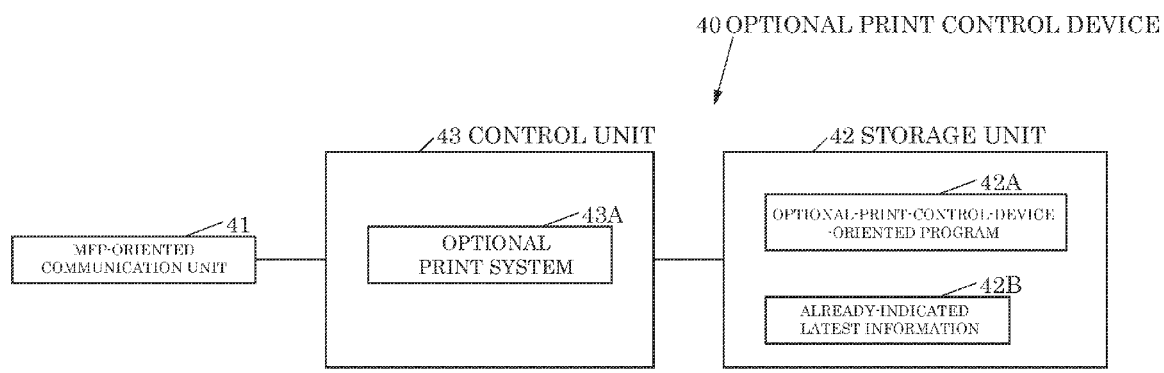
FIG. 7 is a block diagram illustrating the structure of an optional print control device in the network.

FIG. 7 is a block diagram illustrating the structure of the optional print control device 40.

The optional print control device 40 includes an MFP-oriented communication unit 41, which communicates with the MFP body 30 (see FIG. 3), a storage unit 42, such as an EEPROM or a hard disk drive (HDD), in which various information can be stored, and a control unit 43 that controls a whole of the optional print control device 40.

The storage unit 42 stores an optional-print-control-device-oriented program 42a, which is executed by the optional print control device 40, and already-indicated latest information 42b, which is the latest print formation of which the optional print system 43a, described later, has notified the print engine 33, the already-indicated latest information 42b being used by the print engine 33 (see FIG. 3) in printing by the print engine 33.

Figure 8:
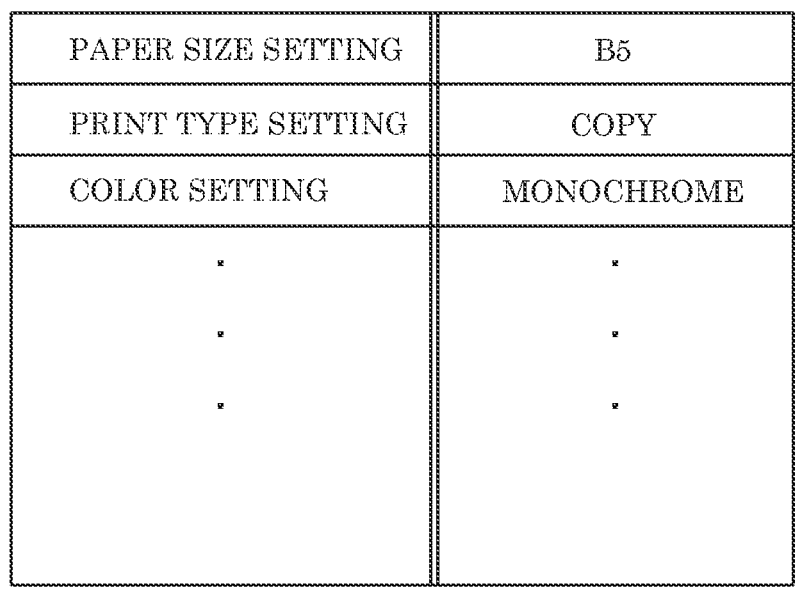
FIG. 8 is a tabular diagram illustrating an example of already-indicated latest information included in the optional print control device.

FIG. 8 illustrates an example of the already-indicated latest information 42b.

The already-indicated latest information 42b includes the same items as the print information 33a in FIG. 4.

The control unit 43 in FIG. 7 includes, for example, a CPU, a ROM in which programs and various types of data are prestored, and a RAM used by the CPU as a work area. The CPU executes programs stored in the ROM or storage unit 42.

When the control unit 43 executes the optional-print-control-device-oriented program 42a stored in the storage unit 42, the control unit 43 functions as the optional print system 43a used as a print control device that controls the print engine 33 in the MFP body 30 according to the print job issued by the job manager 39a in the MFP body 30.

The optional print system 43a performs drawing process depending on the print job. The optional print system 43a can also command the print engine 33 to perform punching, stapling, or other post-process according to the print job.

The MFP print system 39b in the MFP body 30 and the optional print system 43a in the optional print control device 40 differ from each other with respect to the control that can be performed for the print engine 33. That is, there is a difference between the control performed by the MFP print system 39b for the print engine 33 and the control performed by the optional print system 43a for the print engine 33. For example, the MFP print system 39b can only make a setting as to whether to perform stapling for a whole of a single print job, but the optional print system 43a can make a setting as to whether to perform stapling for a set of any number of recording media that are consecutively printed in a single print job.

The MFP print system 39b in the MFP body 30 and the optional print system 43a in the optional print control device 40 operate independently. That is, the MFP print system 39b in the MFP body 30 and the optional print system 43a in the optional print control device 40 operate at their proprietary timings without adjusting the time at which to perform process.

Figure 9:
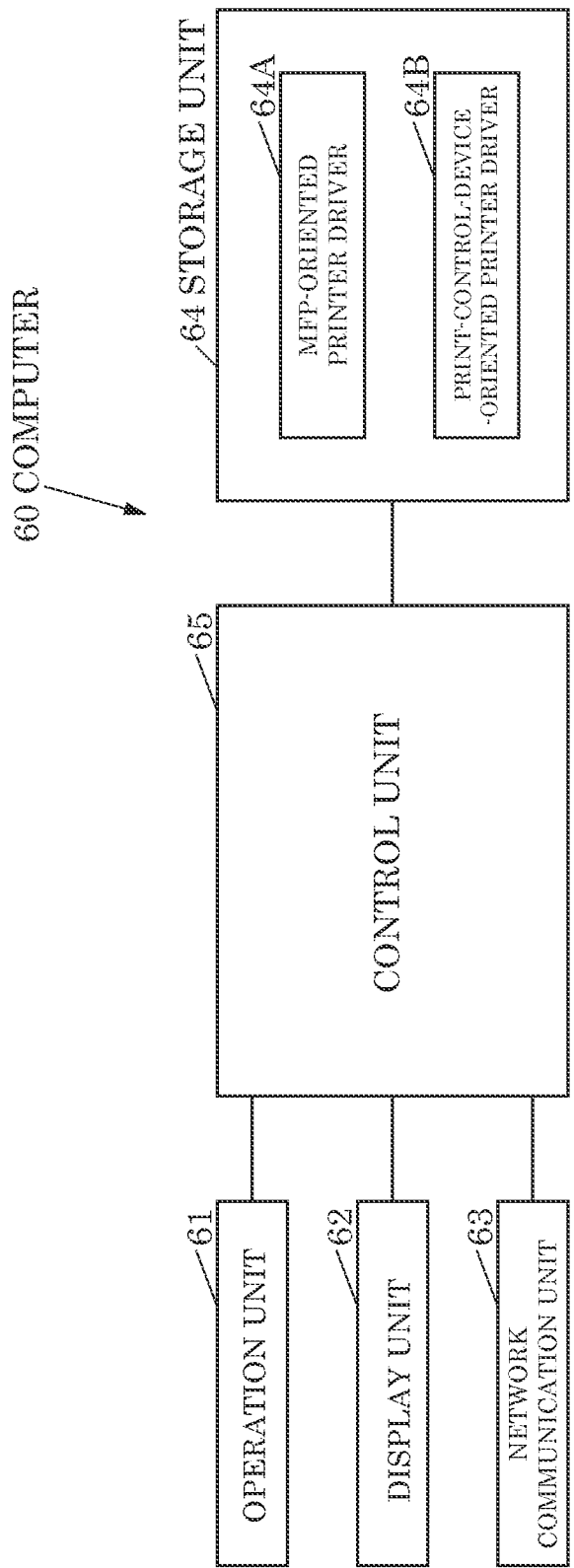
FIG. 9 is a block diagram illustrating the structure of a computer in the network system.

FIG. 9 is a block diagram illustrating the structure of the computer 60.

The computer 60 includes an operation unit 61, which is an input device having a keyboard, a mouse and other devices used by a user to have various operations accepted, a display unit 62, which is a display device such as an LCD that displays various types of information, a network communication unit 63, which is a network communication device that communicates with an external apparatus through the network 11, a storage unit 64, which is a storage device such as an HDD in which various types of information can be stored, and a control unit 65 that controls the whole computer 60.

The storage unit 64 stores an MFP-oriented printer driver 64a, which is a program that causes the MFP body 30 alone in the MFP 20 to perform printing on a recording medium, and also stores a print-control-device-oriented printer driver 64b, which is a program that causes the MFP body 30 and optional print control device 40 in the MFP 20 to perform printing on a recording medium in cooperation with each other.

The MFP-oriented printer driver 64a and print-control-device-oriented printer driver 64b may be installed in the computer 60 during the manufacturing of the computer 60, may be installed in the computer 60 from a compact disk (CD), a digital versatile disk (DVD), a USB memory, or another type of storage medium, or may be installed in the computer 60 through the network 11.

The control unit 65 includes, for example, a CPU, a ROM in which programs and various types of data are prestored, and a RAM used by the CPU as a work area. The CPU executes programs stored in the ROM or storage unit 64.

Next, operations of the network system 10 will be described.

The flow of a print job in the MFP 20 will be described first.

The control unit 39 in the MFP body 30 receives a copy command through the operation unit 31 and causes the scanner 34 to read an image from a draft, after which the control unit 39 requests the job manager 39a to execute a print job according to the image read by the scanner 34. Then, the control unit 39 assigns a job ID to the print job and stores the job ID and "print job targeted at the MFP print system", which is job type information about this print job, in the job information 38b stored in the storage unit 38 in correspondence to each other.

The control unit 39 in the MFP body 30 receives FAX data transmitted from an external facsimile machine through the facsimile communication unit 35, after which the control unit 39 requests the job manager 39a to perform a print job according to the FAX data. Then, as described above, the control unit 39 assigns a job ID to the print job and stores the job ID and "print job targeted at the MFP print system", which is job type information about this print job, in the job information 38b stored in the storage unit 38 in correspondence to each other.

The control unit 39 in the MFP body 30 receives print data, through the network communication unit 36, that has been transmitted from the MFP-oriented printer driver 64a in the computer 60 through the network communication unit 63, after which the control unit 39 requests the job manager 39a to execute a print job according to this print data. Then, as described above, the control unit 39 assigns a job ID to the print job and stores the job ID and "print job targeted at the MFP print system", which is job type information about this print job, in the job information 38b stored in the storage unit 38 in correspondence to each other.

The control unit 39 in the MFP body 30 receives print data, through the network communication unit 36, that has been transmitted from the print-control-device-oriented printer driver 64b in the computer 60 through the network communication unit 63, after which the control unit 39 requests the job manager 39a to perform a print job according to this print data. Then, the control unit 39 assigns a job ID to the print job and stores the job ID and "print job targeted at the optional print system", which is job type information about this print job, in the job information 38b stored in the storage unit 38 in correspondence to each other.

Figure 10:
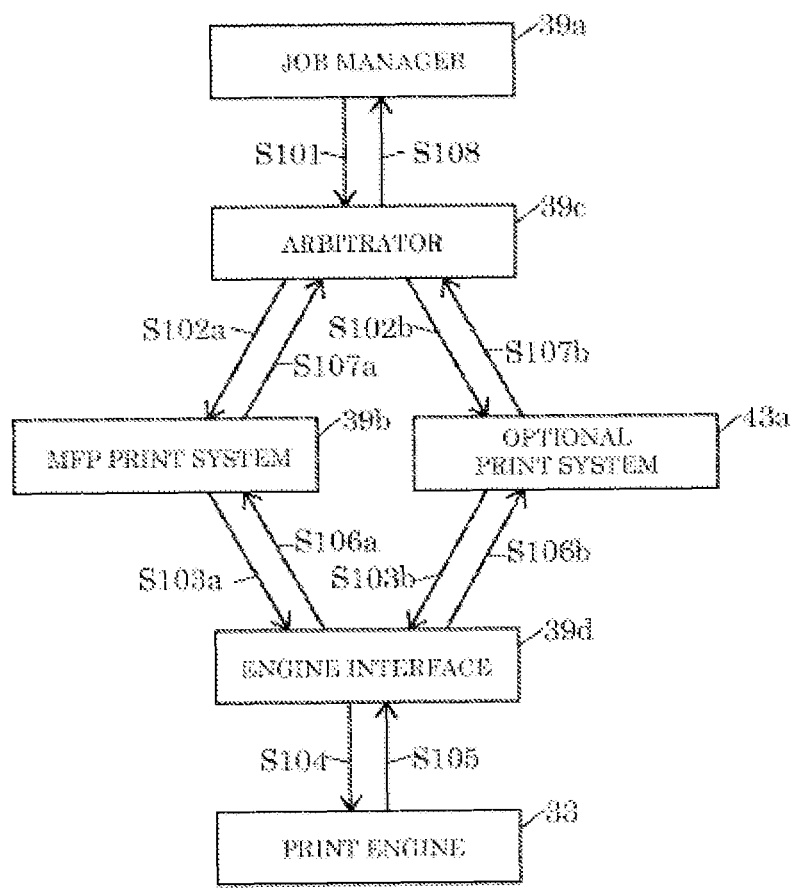
FIG. 10 is a flowchart illustrating a flow of print job process in the MFP.

FIG. 10 is a flowchart illustrating the flow of a print job process in the MFP 20.

The job manager 39a notifies the arbitrator 39c of print jobs requested to be executed in the order in which execution of these print jobs has been requested (S101). That is, the job manager 39a executes print jobs requested to be executed in the order in which execution of these print jobs has been requested.

If the print job of which the arbitrator 39c has been notified by the job manager 39a in S101 is a print job targeted at the MFP print system 39b, the arbitrator 39c notifies the MFP print system 39b of this print job (S102a).

The MFP print system 39b performs drawing process and other process depending on the print job of which the MFP print system 39b has been notified by the arbitrator 39c in S102a to create, for each page in the print job, data of which the print engine 33 is to be notified, and sequentially notifies the engine interface 39d of the created page-specific data (S103a).

The engine interface 39d sequentially notifies the print engine 33 of the page-specific data of which the engine interface 39d has been notified by the MFP print system 39b in S103a (S104).

The print engine 33 sequentially performs printing on recording media according to the page-specific data of which the print engine 33 has been notified by the engine interface

39*d* in S104. Then, the print engine 33 sequentially notifies the engine interface 39*d* for each page that printing on the page has been completed (S105).

The engine interface 39*d* sequentially notifies the MFP print system 39*b* for each page that printing on the page has been completed, as notified by the print engine 33 in S105 (S106*a*).

If the MFP print system 39*b* determines, according to the notification of completion of page-specific pinging, the notification being received from the engine interface 39*d* in S106*a*, that the engine interface 39*d* has notified the MFP print system 39*b* that printing on all pages in the print job had been completed, the MFP print system 39*b* notifies the arbitrator 39*c* that execution of this print job has been completed (S107*a*).

The arbitrator 39*c* notifies the job manager 39*a* of completion of the print job, as notified by the MFP print system 39*b* in S107*a* (S108).

If the print job of which the arbitrator 39*c* has been notified by the job manager 39*a* in S101 is a print job targeted at the optional print system 43*a*, the arbitrator 39*c* notifies the optional print system 43*a* of this print job (S102*b*). The notification of the print job sent from the arbitrator 39*c* to the optional print system 43*a* is input from the arbitrator 39*c* through the optional-print-control-device-oriented communication unit 37 in the MFP body 30 and then the MFP-oriented communication unit 41 in the optional print control device 40 to the optional print system 43*a*.

The optional print system 43*a* performs drawing process and other process depending on the print job of which the optional print system 43*a* has been notified by the arbitrator 39*c* in S102*b* to create, for each page in the print job, data of which the print engine 33 is to be notified, and sequentially notifies the engine interface 39*d* of the created page-specific data (S103*b*). The notification of the print job sent from the optional print system 43*a* to the engine interface 39*d* is input from the optional print system 43*a* through the MFP-oriented communication unit 41 in the optional print control device 40 and then the optional-print-control-device-oriented communication unit 37 in the MFP body 30 to the engine interface 39*d*.

The engine interface 39*d* sequentially notifies the print engine 33 of the page-specific data of which the engine interface 39*d* has been notified by the optional print system 43*a* in S103*b* (S104).

The print engine 33 sequentially performs printing on the recording media according to the page-specific data of which the print engine 33 has been notified by the engine interface 39*d* in S104. Then, the print engine 33 sequentially notifies the engine interface 39*d* for each page that printing on the page has been completed (S105).

The engine interface 39*d* sequentially notifies the optional print system 43*a* for each page that printing on the page has been completed, as notified by the print engine 33 in S105 (S106*b*).

If the optional print system 43*a* determines, according to the notification of completion of page-specific pinging, the notification being received from the engine interface 39*d* in S106*b*, that the engine interface 39*d* has notified the optional print system 43*a* that printing on all pages in the print job had been completed, the optional print system 43*a* notifies the arbitrator 39*c* that execution of this print job has been completed (S107*b*).

The arbitrator 39*c* notifies the job manager 39*a* of completion of the print job, as notified by the optional print system 43*a* in S107*b* (S108).

Next, operations of the arbitrator 39*c* will be described.

First, an operation of the arbitrator 39*c* will be described that is performed when the job manager 39*a* notifies the arbitrator 39*c* of a new print job.

Figure 11:
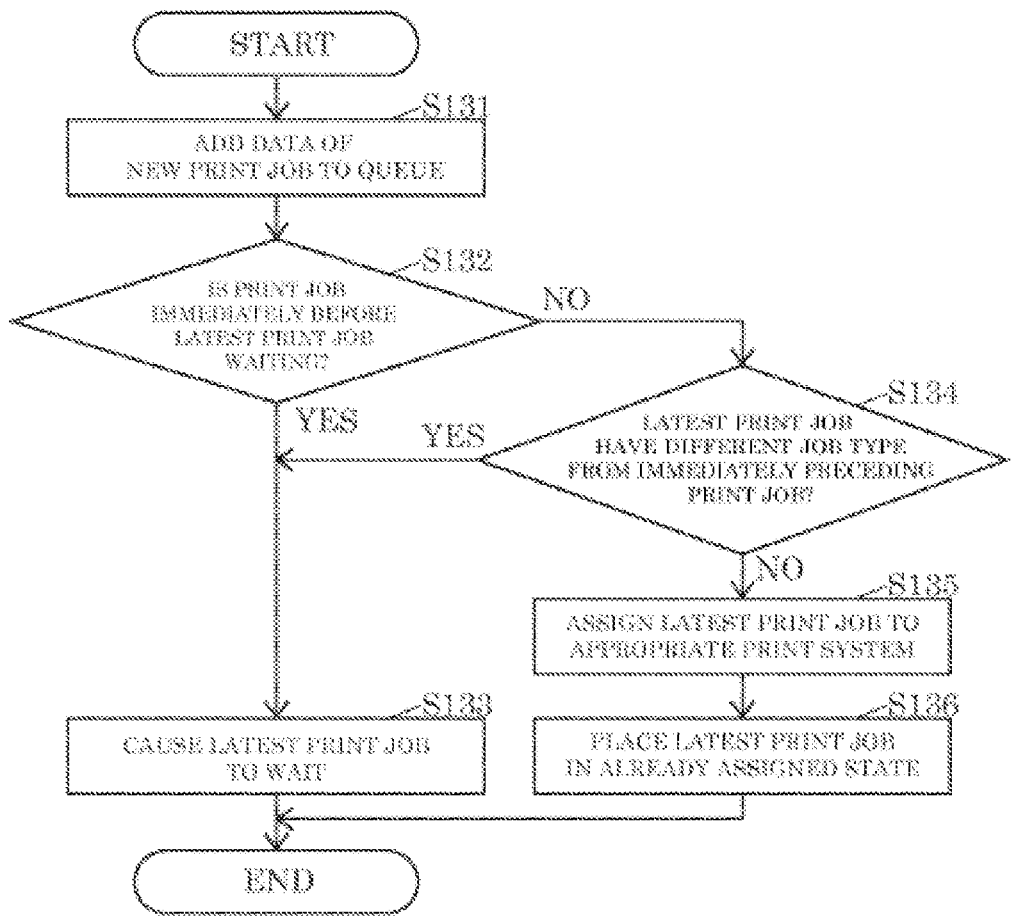
FIG. 11 is a flowchart illustrating an operation of an arbitrator that is performed in the MFP body when a notification of a new print job is received from a job manager.

FIG. 11 is a flowchart illustrating an operation of the arbitrator 39*c* that is performed when a notification of a new print job is received from the job manager 39*a*.

When the job manager 39*a* notifies the arbitrator 39*c* of a new print job, the arbitrator 39*c* operates as illustrated in FIG. 11.

As illustrated in FIG. 11, the arbitrator 39*c* adds data of the new print job (referred to below as the latest print job) of which the arbitrator 39*c* has been notified by the job manager 39*a* (S131).

FIG. 12A illustrates an example of a queue managed by the arbitrator 39*c*. FIG. 12B illustrates an example of another queue managed by the arbitrator 39*c*. FIG. 12C illustrates an example of yet another queue managed by the arbitrator 39*c*.

In the queues illustrated in FIGS. 12A, 12B, and 12C, the job ID of each print job and its corresponding job type and job state are recorded as the data of the print job. The smaller the sequence number of the print job data is, the earlier the data has been stored in the queue. In FIGS. 12A, 12B, and 12C, only three print job data items are stored, four or more print job data items can be stored.

Since the arbitrator 39*c* is notified of the job ID of a print job by the job manager 39*a*, the arbitrator 39*c* obtains the job type of the print job with reference to the job information 38*b* in the storage unit 38.

As illustrated in FIG. 11, the arbitrator 39*c* determines whether a print job of which the arbitrator 39*c* has been notified by the job manager 39*a* immediately before a notification of the latest print job (this print job will be referred to below as the print job immediately preceding the latest print job or simply as the immediately preceding print job) is waiting to be assigned to one of the MFP print system 39*b* and optional print system 43*a* (S132).

If, for example, the queue in which the data of the latest print job has been stored is in the state indicated in FIG. 12A, the state of the print job with a sequence number of 2, which is the print job immediately preceding the latest print job, that is, the print job with a sequence number of 3, is "waiting". Therefore, the arbitrator 39*c* determines in S132 that the print job immediately preceding the latest print job is waiting to be assigned to one of the MFP print system 39*b* and optional print system 43*a*.

If the queue in which the data of the latest print job has been stored is in the state indicated in FIG. 12B or 12C, the state of the print job with a sequence number of 2, which is the print job immediately preceding the latest print job, that is, the print job with a sequence number of 3, is "already assigned". Therefore, the arbitrator 39*c* determines in S132 that the print job immediately preceding the latest print job is not waiting to be assigned to one of the MFP print system 39*b* and optional print system 43*a*.

In a case as well in which there is no print job immediately preceding the latest print job, the arbitrator 39*c* determines in S132 that the print job immediately preceding the latest print job is not waiting to be assigned to one of the MFP print system 39*b* and optional print system 43*a*.

If the arbitrator 39*c* determines in S132 that the print job immediately preceding the latest print job is waiting to be assigned to one of the MFP print system 39*b* and optional print system 43*a*, the arbitrator 39*c* causes the latest print job to wait to be assigned to one of the MFP print system 39*b* and optional print system 43*a* (S133). That is, the arbitrator 39*c* places the latest print job in the "waiting" state.

If, for example, the queue in which the data of the latest print job has been stored is in the state indicated in FIG. 12A, the arbitrator 39c places the latest print job, that is, the print job with a sequence number of 3, in the "waiting" state in S133.

Upon completion of the process in S133, the arbitrator 39c terminates the operation in FIG. 11.

If the arbitrator 39c determines in S132 the print job immediately preceding the latest print job is not waiting to be assigned to one of the MFP print system 39b and optional print system 43a, the arbitrator 39c determines whether the job type of the latest print job differs from the job type of the immediately preceding print job (S134).

If, for example, the queue in which the data of the latest print job has been stored is in the state indicated in FIG. 12B, the job type of the latest print job, that is, the print job with a sequence number of 3, is "print job targeted at the MFP print system" and the job type of the print job immediately preceding the latest print job, that is, the print job with a sequence number of 2, is "print job targeted at the optional print system". Therefore, the arbitrator 39c determines in S134 that the latest print job has a different job type from the immediately preceding print job.

If the queue in which the data of the latest print job has been stored is in the state indicated in FIG. 12C, the job type of the latest print job, that is, the print job with a sequence number of 3, is "print job targeted at the MFP print system" and the job type of the print job immediately before the latest print job, that is, the print job with a sequence number of 2, is also "print job targeted at the MFP print system". Therefore, the arbitrator 39c determines in S134 that the latest print job has the same job type as the immediately preceding print job.

In a case where there is no print job immediately preceding the latest print job, the arbitrator 39c determines in S134 that the latest print job has the same job type as the immediately preceding print job.

If the arbitrator 39c determines in S134 that the latest print job has a different job type from the immediately preceding print job, the arbitrator 39c causes the latest print job to wait to be assigned to one of the MFP print system 39b and optional print system 43a (S133). That is, the arbitrator 39c places the latest print job in the "waiting" state.

If, for example, the queue in which the data of the latest print job has been stored is in the state indicated in FIG. 12B, the arbitrator 39c places the latest print job, that is, the print job with a sequence number of 3, in the "waiting" state in S133.

Upon completion of the process in S133, the arbitrator 39c terminates the operation in FIG. 11.

If the arbitrator 39c determines in S134 that the job type of the latest print job is not different from the job type of the immediately preceding print job, that is, the latest print job has the same job type as the immediately preceding print job, the arbitrator 39c assigns the latest print job to the MFP print system 39b or the optional print system 43a, whichever is a print system appropriate for the latest print job (S135). That is, if the type of the latest print job is "print job targeted at the MFP print system", the arbitrator 39c assigns the latest print job to the MFP print system 39b (S102a); if the type of the latest print job is "print job targeted at the optional print system", the arbitrator 39c assigns the latest print job to the optional print system 43a (S102b).

The arbitrator 39c then places the latest print job in the "already assigned" state (S136).

If, for example, the queue in which the data of the latest print job has been stored is in the state indicated in FIG. 12C, the arbitrator 39c assigns the latest print job, that is, the print job with a sequence number of 3, to the MFP print system 39b in S135 and then places this latest print job in the "already assigned" state in S136.

Upon completion of the process in S136, the arbitrator 39c terminates the operation in FIG. 11.

Next, an operation of the arbitrator 39c will be described that is performed when the arbitrator 39c receives a notification of completion of print job execution from the print system.

Figure 13:
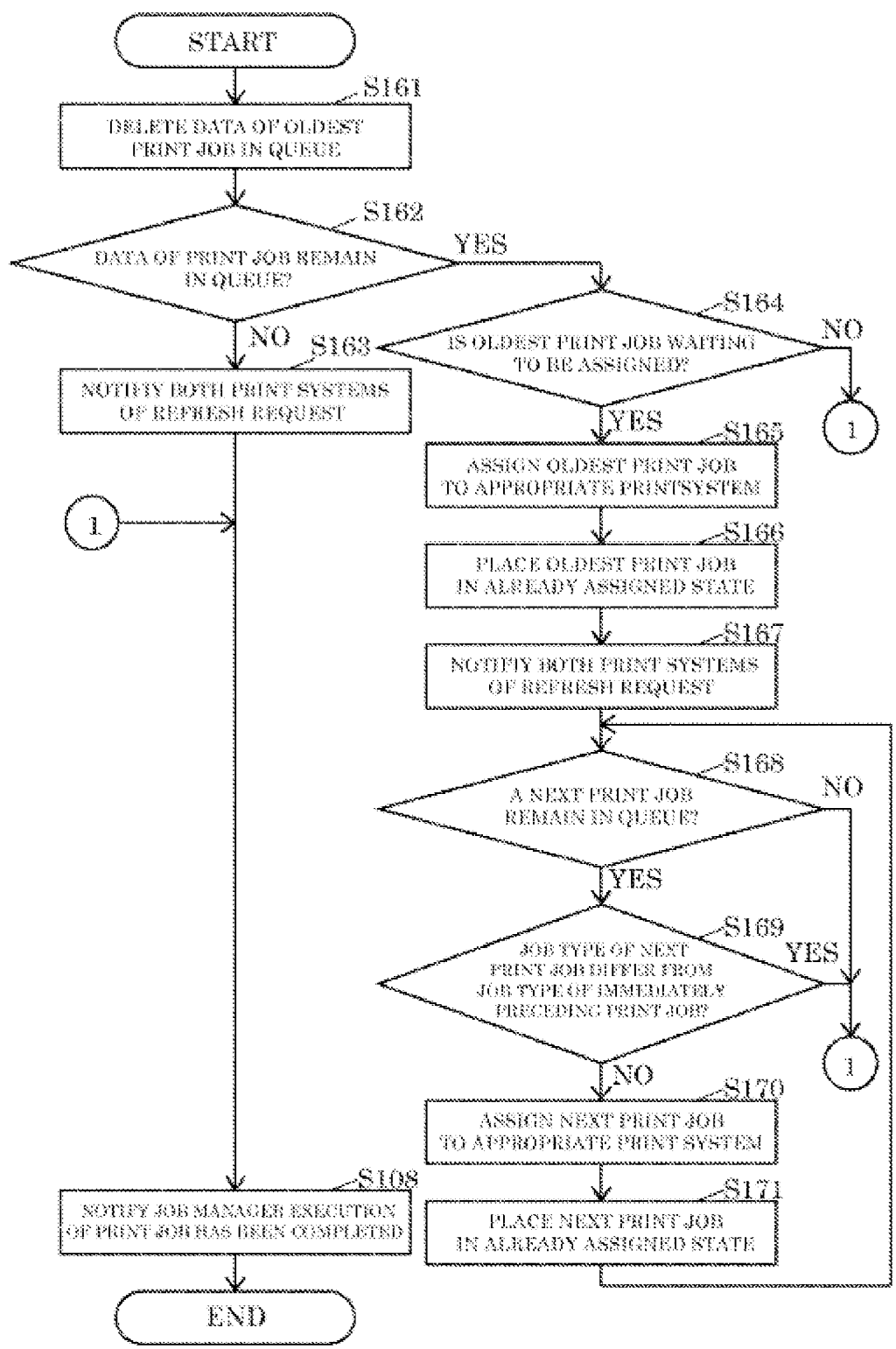
FIG. 13 is a flowchart illustrating an operation of the arbitrator that is performed when a notification of completion of print job execution is received from the MFP print system or an optional print system.

FIG. 13 is a flowchart illustrating an operation of the arbitrator 39c that is performed when the arbitrator 39c receives a notification of completion of print job execution from the MFP print system 39b or optional print system 43a.

When the arbitrator 39c receives a notification of completion of print job execution from a print system, the arbitrator 39c operates as illustrated in FIG. 13.

As illustrated in FIG. 13, the arbitrator 39c deletes, from the queue, the data of a print job for which the arbitrator 39c has received a notification of completion of print job execution from a print system, that is, the MFP print system 39b or optional print system 43a (S161). That is, the arbitrator 39c deletes the data of the oldest print job in the queue.

The arbitrator 39c then determines whether data of the print job remains in the queue (S162).

If the arbitrator 39c determines in S162 that there is no remaining data of the print job in the queue, the arbitrator 39c notifies both the MFP print system 39b and optional print system 43a of a refresh request, which requests the print system to delete already-indicated latest information managed by the print system (S163).

The arbitrator 39c then notifies the job manager 39a that execution of the print job of which the arbitrator 39c had been notified by the print system has been completed (S108) and terminates the operation in FIG. 13.

If the arbitrator 39c determines in S162 that there is remaining data of the print job in the queue, the arbitrator 39c determines, as in the process in S132, whether the oldest print job is waiting to be assigned to one of the MFP print system 39b and optional print system 43a (S164).

If, for example, the queue immediately before the process in S161 is performed is in the state indicated in FIG. 12A, the oldest print job in S164 is the print job with a sequence number of 2 in FIG. 12A. Since this print job is placed in the "waiting" state, however, the arbitrator 39c determines in S164 that the oldest print job is waiting to be assigned to one of the MFP print system 39b and optional print system 43a.

If, for example, the queue immediately before the process in S161 is performed is in the state indicated in FIG. 12B or 12C, the oldest print job in S164 is the print job with a sequence number of 2 in FIG. 12B or 12C. Since this print job is placed in the "already assigned" state, however, the arbitrator 39c determines in S164 that the oldest print job is not waiting to be assigned to one of the MFP print system 39b and optional print system 43a.

If the arbitrator 39c determines in S164 that the oldest print job is not waiting to be assigned to one of the MFP print system 39b and optional print system 43a, the arbitrator 39c notifies the job manager 39a that execution of the print job of which the arbitrator 39c had been notified by the print system has been completed (S108) and terminates the operation in FIG. 13.

If the arbitrator 39c determines in S164 that the oldest print job is waiting to be assigned to one of the MFP print system 39b and optional print system 43a, the arbitrator 39c assigns the oldest print job to the MFP print system 39b or the optional print system 43a, whichever is a print system appropriate for the oldest print job, as in the process in S135 (S165).

The arbitrator 39c then places the oldest print job in the "already assigned" state, as in the process in S136 (S166).

If, for example, the queue immediately before the process in S161 is performed is in the state indicated in FIG. 12A, the oldest print job in S164 to S166 is the print job with a sequence number of 2 in FIG. 12A, so the arbitrator 39c assigns this print job to the optional print system 43a in S165 and places the print job in the "already assigned" state in S166.

Upon completion of the process in S166, the arbitrator 39c notifies the print systems, that is, both the MFP print system 39b and optional print system 43a, of a refresh request, which requests the print system to delete the already-indicated latest information managed by the print system (S167).

Upon completion of the process in S167, the arbitrator 39c determines whether a next print job after the print job that has been handled remains in the queue (S168).

If, for example, the print job that has been handled immediately before the process in S168 is the print job with a sequence number of 2 in FIG. 12A, the arbitrator 39c determines in S168 that a print job after this print job, that is, the print job with a sequence number of 3 in FIG. 12A remains in the queue.

If the arbitrator 39c determines in S168 that there is no remaining next print job after the print job that has been handled in the queue, the arbitrator 39c notifies the job manager 39a that execution of the print job of which the arbitrator 39c had been notified by the print system has been completed (S108) and terminates the operation in FIG. 13.

If the arbitrator 39c determines in S168 that a next print job after the print job that has been handled remains in the queue, the arbitrator 39c determines, as in the process in S134, whether the job type of the next print job differs from the job type of the immediately preceding print job (S169).

If, for example, the immediately preceding print job and next job in S169 are respectively the print job with a sequence number of 2 and the print job with sequence number of 3 in FIG. 12A, the arbitrator 39c determines in S169 that the job type of the next print job differs from the job type of the immediately preceding print job.

If the arbitrator 39c determines in S169 that the job type of the next print job differs from the job type of the immediately preceding print job, the arbitrator 39c notifies the job manager 39a that execution of the print job of which the arbitrator 39c had been notified by the print system has been completed (S108) and terminates the operation in FIG. 13.

If the arbitrator 39c determines in S169 that the job type of the next print job is not different from the job type of the immediately preceding print job, that is, the next print job has the same job type as the immediately preceding print job, the arbitrator 39c assigns the next print job to the MFP print system 39b or the optional print system 43a, whichever is a print system appropriate for the next print job, as in the process in S135 (S170).

Next, the arbitrator 39c places the next print job in the "already assigned" state as in the process in S136 (S171), and returns to process in S168.

Next, an operation of the MFP print system 39b will be described that is performed when the arbitrator 39c assigns a print job to the MFP print system 39b.

Figure 14:
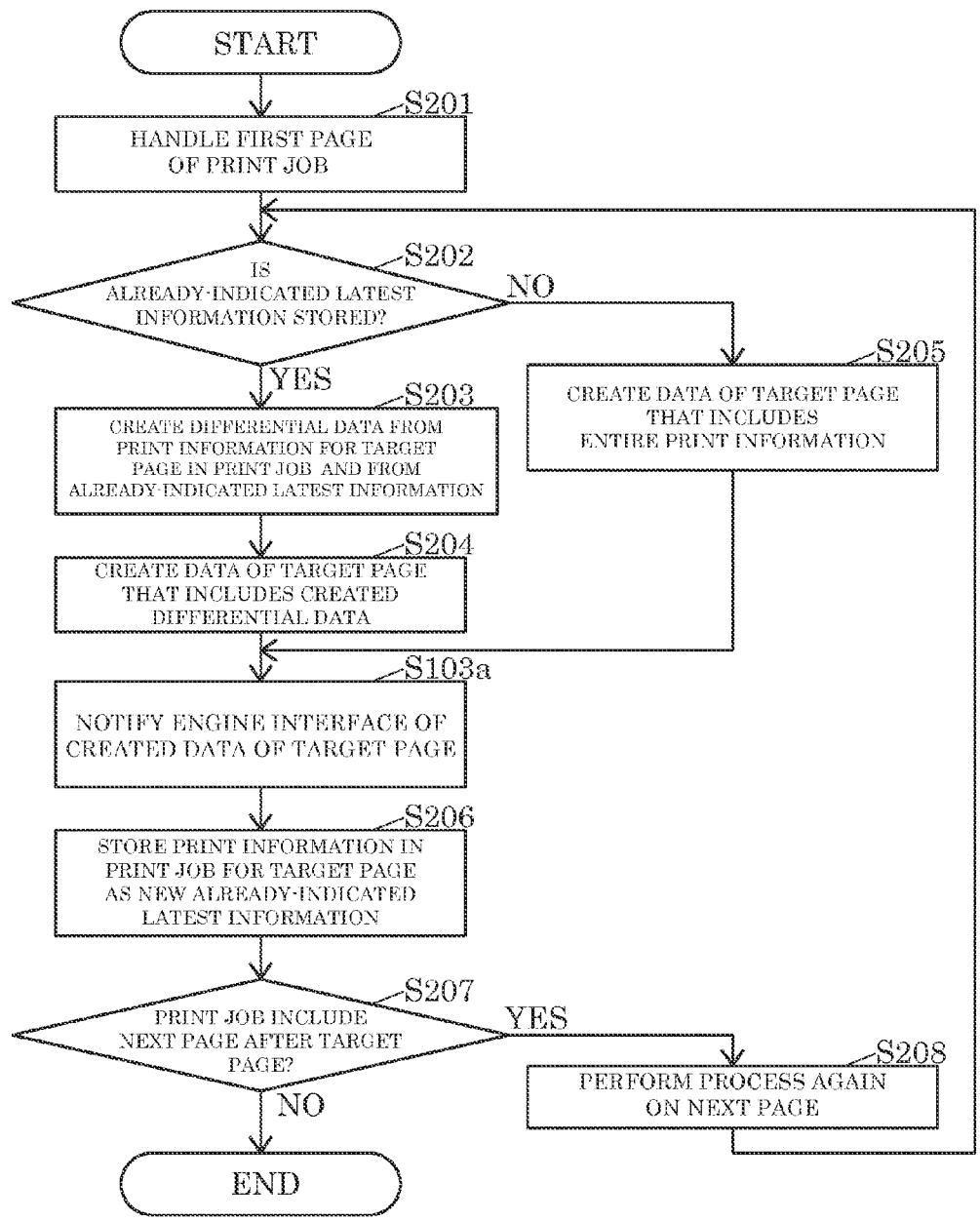
FIG. 14 is a flowchart illustrating an operation of the MFP print system that is performed when the arbitrator assigns a print job to the MFP print system.

FIG. 14 is a flowchart illustrating an operation of the MFP print system 39b that is performed when the arbitrator 39c assigns a print job to the MFP print system 39b.

When the arbitrator 39c assigns a print job to the MFP print system 39b, the MFP print system 39b operates as illustrated in FIG. 14.

As illustrated in FIG. 14, the MFP print system 39b handles a first page of the print job of which the MFP print system 39b has been notified by the arbitrator 39c in S102a (S201).

Next, the MFP print system 39b determines whether the already-indicated latest information 38c is stored in the storage unit 38 (S202).

If the MFP print system 39b determines in S202 that the already-indicated latest information 38c is stored in the storage unit 38, the MFP print system 39b creates differential data from print information that is set, in the print job, for the target page in the print job and from the already-indicated latest information 38c stored in the storage unit 38 (S203).

FIG. 15 illustrates an example of differential data created by the MFP print system 39b.

As illustrated in FIG. 15, the differential data includes only part of items in the print information rather than all items in the print information.

As illustrated in FIG. 14, upon completion of the process in S203, the MFP print system 39b performs drawing process and other process depending on the print job to create data of the target page, the print engine 33 being notified of the created data (S204). The MFP print system 39b includes the created differential data in the data of the target page in S203.

If the MFP print system 39b determines in S202 that the already-indicated latest information 38c is not stored in the storage unit 38, the MFP print system 39b performs drawing process and other process depending on the print job to create data of the target page, the print engine 33 being notified of the created data (S205). The MFP print system 39b includes the entire print information in the data of the target page, the entire print information being set, in the print job, for the target page.

Upon completion of the process in S204 or S205, the MFP print system 39b notifies the engine interface 39d of the created page-specific data (S103a).

Next, the MFP print system 39b stores the print information that is set, in the print job, for the target page in the storage unit 38 as the new already-indicated latest information 38c (S206).

Next, the MFP print system 39b determines whether the print job includes a next page after the target page (S207).

If the MFP print system 39b determines in S207 that the print job includes a next page after the target page, the MFP print system 39b performs the process in S202 again on the next page after the target page (S208).

If the MFP print system 39b determines in S207 that the print job does not include a next page after the target page, the MFP print system 39b terminates the operation in FIG. 14.

Next, an operation of the MFP print system 39b will be described that is performed when a notification of a refresh request is received from the arbitrator 39c.

Figure 16:
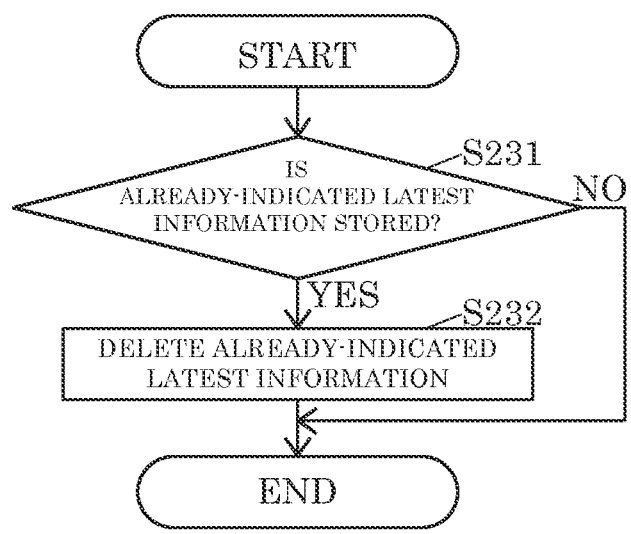
FIG. 16 is a flowchart illustrating an operation of the MFP print system that is performed when a notification of a refresh request is received from the arbitrator.

FIG. 16 is a flowchart illustrating an operation of the MFP print system 39b that is performed when a notification of a refresh request is received from the arbitrator 39c.

When notified of a refresh request by the arbitrator 39c, the MFP print system 39b operates as illustrated in FIG. 16.

As illustrated in FIG. 16, the MFP print system 39b determines whether the already-indicated latest information 38c is stored in the storage unit 38 (S231).

If the MFP print system 39b determines in S231 that the already-indicated latest information 38c is stored in the storage unit 38, the MFP print system 39b deletes the already-indicated latest information 38c from the storage unit 38 (S232) and terminates the operation in FIG. 16.

If the MFP print system 39b determines in S231 that the already-indicated latest information 38c is not stored in the storage unit 38, the MFP print system 39b terminates the operation in FIG. 16 without performing further process.

The MFP print system 39b can perform the operation in FIG. 16 concurrently with the operation in FIG. 14.

So far, operations of the MFP print system 39b have been described. The optional print system 43a also operates in the same way as the MFP print system 39b except that the already-indicated latest information 42b is used instead of the already-indicated latest information 38c.

Figure 17:
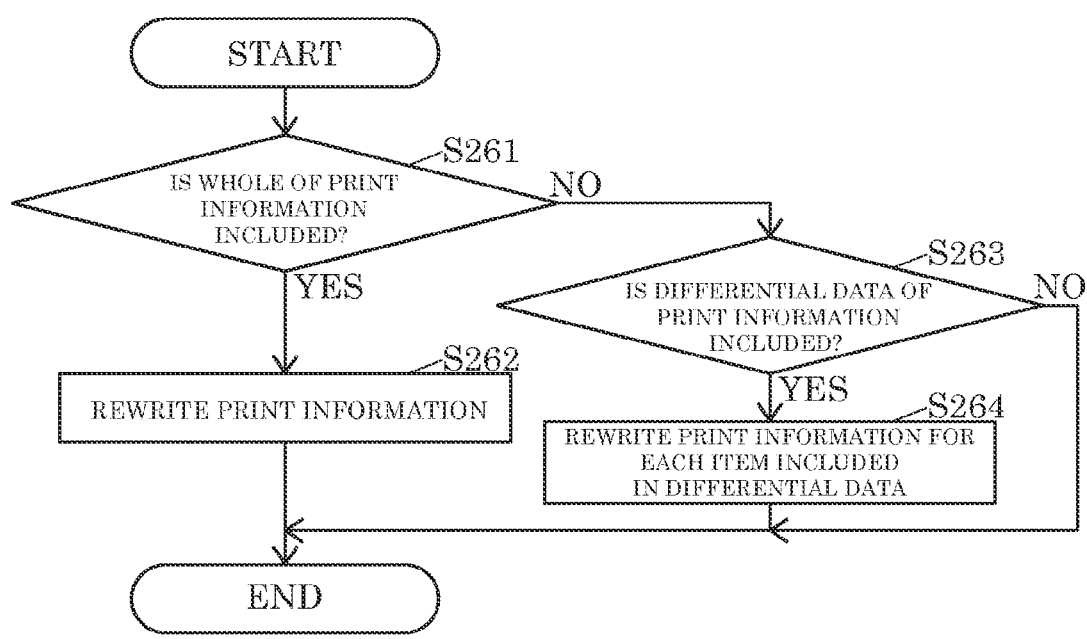
FIG. 17 is a flowchart illustrating an operation of a print engine to rewrite print information.

FIG. 17 is a flowchart illustrating an operation of a print engine 33 to rewrite the print information 33a.

When notified of page-specific data by the engine interface 39d, the print engine 33 operates as illustrated in FIG. 17.

As illustrated in FIG. 17, the print engine 33 determines whether all of the print information is included in the page-specific data of which the print engine 33 has been notified by the engine interface 39d (S261).

If the print engine 33 determines in S261 that all of the print information is included in the page-specific data of which the print engine 33 has been notified by the engine interface 39d, the print engine 33 uses the print information included in the page-specific data of which the print engine 33 has been notified by the engine interface 39d as new print information to rewrite the print information 33a (S262) and terminates the operation in FIG. 17.

If the print engine 33 determines in S261 that all of the print information is not included in the page-specific data of which the print engine 33 has been notified by the engine interface 39d, the print engine 33 determines whether differential data of print information is included in the page-specific data of which the print engine 33 has been notified by the engine interface 39d (S263).

If the print engine 33 determines in S263 that differential data of print information is included in the page-specific data of which the print engine 33 has been notified by the engine interface 39d, the print engine 33 uses the differential data as new print information to rewrite the print information 33a for each item included in the differential data of the print information in the page-specific data of which the print engine 33 has been notified by the engine interface 39d (S264) and terminates the operation in FIG. 17.

If the print engine 33 determines in S263 that differential data of print information is not included in the page-specific data of which the print engine 33 has been notified by the engine interface 39d, the print engine 33 terminates the operation in FIG. 17 without performing further process.

When the print engine 33 performs printing on a recording medium according to the page-specific data of which the print engine 33 has been notified by the engine interface 39d in S104, the print engine 33 uses the print information 33a.

Thus, with the MFP 20, when the MFP print system 39b and optional print system 43a notify the print engine 33 of print information (S103a and S103b), they notify the print engine 33 of only a difference between this print information and the already-indicated latest information, which is the latest information of which the print engine 33 has been notified, rather than all of the print information (S203 and S204). Accordingly, the amount of information of which the MFP print system 39b and optional print system 43a notify the print engine 33 can be reduced. As a result, the processing time taken by the MFP print system 39b and optional print system 43a to notify the print engine 33 of print information can be shortened. This enables the MFP 20 to complete printing at high speed by using the MFP print system 39b or the optional print system 43a, whichever is a print system appropriate for the print job issued by the job manager 39a.

With the MFP 20, if the arbitrator 39c switches the print system to which to assign a print job to the MFP print system 39b or optional print system 43a (the result in S164 is Yes), the arbitrator 39c causes the switched-to print system to delete the already-indicated latest information managed by the switched-to print system (S167). This eliminates the need for the MFP print system 39b and optional print system 43a to mutually recognize the already-indicated latest information. Therefore, the MFP 20 can eliminate processing time that would otherwise be taken by the MFP print system 39b and optional print system 43a to mutually recognize the already-indicated latest information, so the MFP 20 can complete printing at high speed as compared with a structure in which the MFP print system 39b and optional print system 43a mutually recognize the already-indicated latest information.

The MFP print system 39b and optional print system 43a in the MFP 20 have different hardware structures. Therefore, it is difficult for the MFP print system 39b and optional print system 43a to mutually recognize the already-indicated latest information as compared with the case in which the MFP print system 39b and optional print system 43a have the same hardware structure. However, the MFP print system 39b and optional print system 43a do not need to mutually recognize the already-indicated latest information, so the MFP 20 is suitable to a structure in which the MFP print system 39b and optional print system 43a have different hardware structures.

If the print system to which to assign a print job is switched to the MFP print system 39b or optional print system 43a (the result in S164 is Yes), the MFP 20 deletes not only the already-indicated latest information managed by the switched-to print system, but also the already-indicated latest information managed by the switched-from print system (S167). When the switched-from print system becomes a switched-to print system again, therefore, there is no need to delete the already-indicated latest information from the switched-to print system, enabling printing to be quickly started accordingly after the print system switchover. When a print system to which to assign a print job is switched to the MFP print system 39b or optional print system 43a, therefore, the MFP 20 can complete printing at high speed as compared with a structure in which when the print system to which to assign a print job is switched to the MFP print system 39b or optional print system 43a, the already-indicated latest information managed by the switched-from print system is not deleted.

If the print engine 33 completes printing for all of a plurality of consecutive print jobs (the result in S162 is No), the MFP 20 deletes the already-indicated latest information managed by the MFP print system 39b and the already-indicated latest information managed by the optional print system 43a (S163). Therefore, when the job manager 39a issues a new print job after the print engine 33 has completed printing for all of a plurality of consecutive print jobs and the new print job is assigned to a print system, the print system does not need to delete the already-indicated latest information. This enables printing to be quickly started accordingly after the new print job has been assigned to the print system. When the print engine 33 completes printing for all of a plurality of consecutive print jobs, therefore, the MFP 20 can complete printing at high speed as compared with a structure in which the already-indicated latest information managed by the MFP print system 39b and the already-indicated latest information managed by the optional print system 43a are not deleted.

If the immediately preceding print job issued by the job manager 39a is a print job targeted at the MFP print system 39b, control of the print engine 33 by the MFP print system 39b is not completed according to the print job assigned to the MFP print system 39b (the result in S132 is No), and a next print job issued by the job manager 39a is targeted at the optional print system 43a (the result in S134 is Yes), the arbitrator 39c in the MFP body 30 in the MFP 20 causes the print job to wait to be assigned to the optional print system 43a (S133). That is, if control of the print engine 33 by the MFP print system 39b is not completed according to the immediately preceding print job, which has been issued by the job manager 39a and has been assigned to the MFP print system 39b, the MFP 20 causes a next print job issued by the job manager 39a to wait to be assigned to the optional print system 43a.

Similarly, if the immediately preceding print job issued by the job manager 39a is a print job targeted at the optional print system 43a, control of the print engine 33 by the optional print system 43a is not completed according to the print job assigned to the optional print system 43a (the result in S132 is No), and a next print job issued by the job manager 39a is targeted at the MFP print system 39b (the result in S134 is Yes), the arbitrator 39c in the MFP body 30 in the MFP 20 causes the print job to wait to be assigned to the MFP print system 39b (S133). That is, if control of the print engine 33 by the optional print system 43a is not completed according to the immediately preceding print job, which has been issued by the job manager 39a and has been assigned to the optional print system 43a, the MFP 20 causes a next print job issued by the job manager 39a to wait to be assigned to the MFP print system 39b.

If the print engine 33 is using, for example, the print information in the MFP print system 39b as the print information, therefore, the MFP 20 can prevent the notification of information completely irrelevant to this print information from being sent from the optional print system 43a to the print engine 33 as differential information. As a result, a print job targeted at the MFP print system 39b and a print job targeted at the optional print system 43a are processed by the print engine 33 according to appropriate print information.

After the MFP 20 assigns an immediately preceding print job issued by the job manager 39a to, for example, the MFP print system 39b, if control of the print engine 33 by the MFP print system 39b is not completed according to the print job, the MFP 20 causes a next print job issued by the job manager 39a to wait to be assigned to the optional print system 43a. This prevents the sequence of printing based on the print job targeted at the MFP print system 39b and printing based on the print job targeted at the optional print system 43a from being inappropriately changed, for example, from being reversed, during printing by the print engine 33. As a result, a printout based on the print job targeted at the MFP print system 39b and a printout based on the print job targeted at the optional print system 43a are ejected in the correct sequence.

If, for example, a print job targeted at the MFP print system 39b, in which 10 copies of printing is performed, and a print job targeted at the optional print system 43a, in which one copy of printing is performed, are input in that order, the MFP 20 first prints 10 copies according to the print job targeted at the MFP print system 39b and then prints one copy according to the print job targeted at the optional print system 43a, assuring printing in the correct sequence. That is, the MFP 20 can prevent incorrect printing in a reversed sequence, in which one copy is first printed according to the print job targeted at the optional print system 43a and then 10 copies are printed according to the print job targeted at the MFP print system 39b. The MFP 20 can also prevent incorrect printing caused by an interrupt that occurs in the printing sequence; in an example of this type incorrect printing, after four copies have been printed according to the print job targeted at the MFP print system 39b, an interrupt occurs to print one copy according to the print job targeted at the optional print system 43a, after which the remaining six copies are printed according to the print job targeted at the MFP print system 39b.

With the MFP 20, the MFP print system 39b and optional print system 43a differ from each other in at least part of the control that can be performed for the print engine 33, so there may be a significant difference between the processing time taken by the MFP print system 39b for a print job that the MFP print system 39b alone can process and the processing time taken by the optional print system 43a for a print job that the optional print system 43a alone can process. However, the MFP 20 can prevent the sequence of printing based on the print job targeted at the MFP print system 39b and printing based on the print job targeted at the optional print system 43a from being inappropriately changed during printing by the print engine 33. As a result, a printout based on the print job targeted at the MFP print system 39b and a printout based on the print job targeted at the optional print system 43a are ejected in the correct sequence.

With the MFP 20, the MFP print system 39b and control unit 43 have different hardware structures; the MFP print system 39b is formed as part of the control unit 39 and the optional print system 43a is formed as part of the control unit 43. Accordingly, there may be a difference between the processing time taken by the MFP print system 39b for a print job assigned to the control unit 39 and the processing time taken by the optional print system 43a for a print job assigned to the optional print system 43a. However, the MFP 20 can prevent the sequence of printing based on the print job targeted at the MFP print system 39b and printing based on the print job targeted at the optional print system 43a from being inappropriately changed during printing by the print engine 33. As a result, a printout based on the print job targeted at the MFP print system 39b and a printout based on the print job targeted at the optional print system 43a are ejected in the correct sequence.

If the immediately preceding print job issued by the job manager 39a is a print job targeted at the MFP print system 39b, control of the print engine 33 by the MFP print system 39b is not completed according to the print job assigned to the MFP print system 39b (the result in S132 is No), and a next print job issued by the job manager 39a is targeted at the MFP print system 39b (the result in S134 is No), the arbitrator 39c in the MFP body 30 in the MFP 20 assigns the print job to the MFP print system 39b (S135). That is, even if control of the print engine 33 is not completed according to the immediately preceding print job, which has been issued by the job manager 39a and has been assigned to the MFP print system 39b, the MFP 20 assigns a next print job issued by the job manager 39a to the MFP print system 39b. Therefore, the MFP 20 can shorten the time taken to perform printing based on a plurality of consecutive jobs targeted at the MFP print system 39b as compared with a structure in which if control of the print engine 33 is not completed according to the immediately preceding print job, which has been issued by the job manager 39a and has been assigned to the MFP print system 39b, the MFP 20 causes a next print job issued by the job manager 39a to wait to be assigned to the MFP print system 39b.

Similarly, if the immediately preceding print job issued by the job manager 39a is a print job targeted at the optional print system 43a, control of the print engine 33 by the optional print system 43a is not completed according to the print job assigned to the optional print system 43a (the result in S132 is No), and a next print job issued by the job manager 39a is targeted at the optional print system 43a (the result in S134 is No), the arbitrator 39c in the MFP body 30 in the MFP 20 assigns the print job to the optional print system 43a (S135). That is, even if control of the print engine 33 is not completed according to the immediately preceding print job, which has been issued by the job manager 39a and has been assigned to the optional print system 43a, the MFP 20 assigns a next print job issued by the job manager 39a to the optional print system 43a. Therefore, the MFP 20 can shorten the time taken to perform printing based on a plurality of consecutive jobs targeted at the optional print system 43a as compared with a structure in which if control of the print engine 33 is not completed according to the immediately preceding print job, which has been issued by the job manager 39a and has been assigned to the optional print system 43a, the MFP 20 causes a next print job issued by the job manager 39a to wait to be assigned to the optional print system 43a.

If the arbitrator 39c in the MFP body 30 in the MFP 20 causes the immediately preceding print job issued by the job manager 39a to wait to be assigned to one of the MFP print system 39b and optional print system 43a (the result in S132 is Yes), the arbitrator 39c causes a next print job issued by the job manager 39a to wait to be assigned to one of the MFP print system 39b and optional print system 43a (S133). That is, the MFP 20 can cause the arbitrator 39c to place a plurality of print jobs in the wait state. Therefore, the MFP 20 can eject printouts based on three or more consecutive print jobs in the correct sequence.

Although, in this embodiment, the image forming apparatus in the present disclosure is an MFP, the image forming apparatus may be an apparatus specific to printing or another image forming apparatus other than an MFP.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus comprising:
an MFP body that performs printing on a recording medium;
an optional print control device that is connected to the MFP body as an option to improve printing functions of the MFP body, wherein the MFP body can print on the recording medium even if the optional control device is not connected to the MFP body; and
two print control devices configured to control a print engine corresponding to a print job issued by a job issuing device, wherein the two print control devices include an MFP print system in the MFP body and an optional print system in the optional print control device, the MFP body including:
the print engine that performs printing on the recording medium;
the job issuing device that issues the print job used by the print engine; and
a job assignment device that assigns the print job issued by the job issuing device to one of the two print control devices that is appropriate for the print job,
wherein each of the two print control devices (i) notifies the print engine of print information, which includes 1) a paper size setting, which indicates a size of paper fed by the print engine, 2) a print type setting, which indicates a type of printing, and 3) a color setting, which indicates which toner, color toner or monochrome toner will be used by the print engine in printing, corresponding to the print job, and (ii) manages already-indicated latest information, which is latest print information of which the print engine has been notified, wherein the each of the two print control devices notifies the print engine of a difference between the print information and the already-indicated latest information,
wherein when the job assignment device makes a switchover between the two print control devices to select a switched-to print control device, which is a print control device to which to assign the print job, the job assignment device causes the switched-to print control device to delete the already-indicated latest information managed by the switched-to print control device,
wherein there is a difference between the control performed by the MFP print system for the print engine and the control performed by the optional print system for the print engine,
wherein the MFP print system makes a setting as to whether to perform stapling for a whole of a single print job, and the optional printing system makes a setting as to whether to perform stapling for a set of any number of the recording media that are consecutively printed in the single print job, and
wherein the MFP print system and the optional print system operate at their proprietary timings without adjusting the time at which to perform process.

2. The image forming apparatus according to claim 1, wherein the two print control devices have different hardware structures.

3. The image forming apparatus according to claim 1, wherein when the job assignment device makes a switchover between the two print control devices to select the switched-to print control device, the job assignment device causes a switched-from print control device, which is a print control device from which the switchover has been made to the switched-to print control device, to delete the already-indicated latest information managed by the switched-from print control device.

4. The image forming apparatus according to claim 1, wherein when the print engine completes printing for all of a plurality of consecutive print jobs, the job assignment device causes each of the two print control devices to delete the already-indicated latest information managed by the each of the two print control devices.

5. The image forming apparatus according to claim 1, wherein if an immediately preceding print job issued by the job issuing device is a print job targeted at a first print control device of the two print control devices, control of the print engine by the first print control device is not completed according to the print job assigned to the first print control device, and a next print job issued by the job issuing device is targeted at a second print control devices of the two print control devices, the job assignment device causes the print job to wait to be assigned to the second print control device.

* * * * *